United States Patent [19]

De Koning

[11] Patent Number: 5,369,176
[45] Date of Patent: Nov. 29, 1994

[54] COMPOSITION TO BE USED IN THE RESIN INJECTION MOLDING TECHNIQUE, CONTAINING LOW MOLECULAR WEIGHT COMPOUNDS JOINTLY FORMING A HYBRID NETWORK

[75] Inventor: Adrianus De Koning, Zwolle, Netherlands

[73] Assignee: DSM N.V., Heerlen, Netherlands

[21] Appl. No.: 200,534

[22] PCT Filed: May 21, 1991

[86] PCT No.: PCT/NL91/00084
§ 371 Date: Nov. 20, 1992
§ 102(e) Date: Nov. 20, 1992

[87] PCT Pub. No.: WO91/18033
PCT Pub. Date: Nov. 28, 1991

Related U.S. Application Data

[63] Continuation of Ser. No. 949,858, Nov. 20, 1992, abandoned.

[30] Foreign Application Priority Data

May 22, 1990 [NL] Netherlands ............... 9001181

[51] Int. Cl.$^5$ .............................. C08L 75/04
[52] U.S. Cl. .................... 525/126; 526/301; 526/319; 526/328; 526/328.5; 526/329; 526/312; 528/75; 264/328.1; 264/328.6; 264/328.8
[58] Field of Search ............................. 525/126; 526/301, 319, 328, 328.5, 329, 329.7; 528/75; 264/328.1, 328.6, 328.8

[56] References Cited

U.S. PATENT DOCUMENTS

| | | | |
|---|---|---|---|
| 4,041,104 | 8/1977 | Selley | 525/126 |
| 4,287,116 | 9/1981 | Burns | 528/76 |

FOREIGN PATENT DOCUMENTS

| | | |
|---|---|---|
| 0064809 | 11/1982 | European Pat. Off. |
| 0151990 | 8/1985 | European Pat. Off. |
| 0197682 | 10/1986 | European Pat. Off. |

*Primary Examiner*—Maurice J. Welsh
*Attorney, Agent, or Firm*—Cushman, Darby & Cushman

[57] ABSTRACT

The present invention relates to a reaction injection molding process, to a composition utilized therein as well as to a kit of parts from which the composition can be obtained. In particular, the process includes the use of a composition which contains at least 70% of low molecular weight compounds which are capable of forming a crosslinked polymer. The first component of the composition is a compound with at least an ethylenic unsaturation and an isocyanate-reactive group. The second component of the composition contains an ethylenically unsaturated monomer capable of copolymerizing with the first component. The third component of the composition is a polyisocyanate. Polymerization of the first and second components takes places prior to the reaction between the first and third components.

15 Claims, No Drawings

COMPOSITION TO BE USED IN THE RESIN INJECTION MOLDING TECHNIQUE, CONTAINING LOW MOLECULAR WEIGHT COMPOUNDS JOINTLY FORMING A HYBRID NETWORK

This is a continuation of Application No. 07/949,858, filed on Nov. 20, 1992 which was abandoned upon the filing hereof.

The invention relates to a composition to be used in the Resin Injection Moulding technique, which composition substantially contains low molecular weight compounds capable of forming a hybrid network, which composition at least contains a first component consisting of a compound with at least an ethylenic unsaturation and an isocyanate-reactive group, and a second component containing an ethylenically unsaturated monomer capable of copolymerizing with the first component, and a third component, which is a polyisocyanate.

Such a composition is described in U.S. Pat. No. 4,822,849. In it the first component is an unsaturated polyester with terminal hydroxyl groups. Such a composition has been found to have the disadvantage that it shrinks during the curing. U.S. Pat. No. 4,822,849 provides a solution for it by reducing the number of unsaturations in the prepolymer, so that the shrinkage resulting from the radical polymerization is reduced. However, the disadvantage of this measure is that the mechanical properties of the material deteriorate in consequence of the reduction of the crosslink density. At the same time, the viscosity of the composition is rather high. In certain applications this is a disadvantage.

The object of the invention is to provide a low viscosity composition with which products with good mechanical properties may be obtained.

An other object of the invention is to provide a low viscosity composition with which products may be obtained with little or no polymerisation shrinkage.

This is achieved according to the invention in that the composition is a composition of monomers with a molecular weight lower than 1000, the first component of which substantially consists of a monomer with substantially 1 terminal vinyl group per molecule and further substantially 1 isocyanate-reactive group per molecule and has a molecular weight lower than 500.

From DE-A-2,209,149 a composition is known containing, inter alia, an ethylenically unsaturated monomer and an adduct of a polyisocyanate and a monomer with an isocyanate-reactive group and a terminal vinyl group, but in it, before mixing the adduct with the ethylenically unsaturated monomer, the polyisocyanate is first prepolymerized, at least in part, with a polyol and with the monomer with the isocyanate-reactive group and the terminal vinyl group. This composition does not exhibit a low viscosity. With the known composition a reduction of the polymerisation shrinkage according the invention is not possible. DE-A-2,209,149 does not mention that this composition can be used for the Resin Injection Moulding (RIM) technique.

From U.S. Pat. No. 3,856,830 a composition is known containing a polyisocyanate and also a monomer with an isocyanate-reactive group and a terminal vinyl group. The polyisocyanate reacts with this monomer to form a urethane oligomer with terminal unsaturations which is capable of polymerizing, optionally in the presence of an ethylenically unsaturated monomer. So, in U.S. Pat. No. 3,856,830, there will first be a reaction of the polyisocyanate with the monomer with the unsaturation and with the isocyanate-reactive group and only after that a composition is obtained of the reaction product with an ethylenically unsaturated monomer.

This composition does not exhibit a low viscosity. With the known composition a reduction of the polymerisation shrinkage according the invention is not possible.

U.S. Pat. No. 3,856,830 does not mentioned that the composition can be used for the RIM technique.

From EP-A-197682 a polymerisable composition is known comprising an ethylenically unsaturated monomer, a low profile additive and an adduct of a polyisocyanate and a monomer with an isocyanate reactive group and a terminal vinyl group. The polyisocyanate is always completely converted into an unsaturated urethane monomer. The low profile additive is an organic polymer. The know polymerisable composition has the disadvantages that first an unsaturated urethane monomer has to be synthesized and that the low profile additive has to be solved into the composition before an in-mould reaction can take place. The known composition does not exhibit a low viscosity due to the general fact that dissolving a polymer rises the viscosity of the solvent. Further, with the known composition a reduction of the polymerisation shrinkage according the invention is not possible.

From EP-A-0064809 a method of producing moulded plastic products by in-mould polymerisation, of an unsaturated urethane component and a vinyl monomer copolymerisable therewith, is known. The unsaturated urethane component is derived from a hydroxyalkyl acrylate or methacrylate by reaction of hydroxyl groups thereof with the isocyanate groups of a polyisocyanate free from urethane groups or with the isocyanate groups of an urethane polyisocyanate. The known in-mould reaction can not be performed according a procedure according the present invention i.e. first initiating the radical polymerisation between the ethylenically unsaturated monomers and subsequently causing the crosslinking to take place by reacting the isocyanates with the isocyanate-reactive groups.

Hence, none of the four references DE-A-2,209,149, U.S. Pat. No. 3,856,830, EP-A-197682, EP-A-64809, describes a system in which both a radical polymerisation and a urethane forming reaction takes place in the mould, since none of the references has free isocyanate in its eventual reaction mixture.

The composition according to the invention preferably consists of monomers with a molecular weight lower than 500, and the first component substantially consists of monomers with a molecular weight lower than 400.

The isocyanate-reactive group is preferably a hydroxyl group.

A composition substantially containing low molecular weight compounds is understood to mean within the scope of this invention a composition containing at least 70% (wt) of such compounds.

An example of the first component is the hydroxyl ester of acrylic acid or methacrylic acid or an allyl alcohol or alkoxylated allyl alcohol.

Using the RIM technique, it has proved to be possible, with the composition according to the invention, to obtain articles with good mechanical and good thermal properties. The HDT in particular is higher than would have been expected by a person skilled in the art.

The first component preferably has the following general formula:

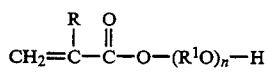

where R is a hydrogen or methyl
$R^1$ is an alkylene group with 2 or 3 carbon atoms and n is a whole number between 1 and 6.

These materials can be made by reacting acrylic acid or methacrylic acid with an alkylene oxide, chosen from the group consisting of ethylene oxide and propylene oxide, in a manner generally known in the art. The number n in the formula equals the ratio between the number of alkylene oxide moles and the number of acrylic acid or methacrylic acid moles.

Examples of the first component are, inter alia, hydroxylpropyl methacrylate, hydroxylethyl methacrylate, hydroxylethyl acrylate, hydroxypropyl acrylate, polyoxyethylene(2)acrylate, polyoxyethylene(2)methacrylate, polyoxyethylene(3)acrylate, polyoxyethylene(3)methacrylate, polyoxypropylene(2)acrylate,- polyoxypropylene(2)methacrylate, polyoxypropylene(3)acrylate and polyoxypropylene(3)methacrylate.

A composition according to the invention makes it possible for a system to be cured by first subjecting the ethylenic unsaturations in the first component together with the ethylenically unsaturated monomers of the second component to a radical polymerization process and subsequently causing the crosslinking to take place by reacting the isocyanates with the isocyanate-reactive groups of the first component.

Preference is given to first initiating the radical polymerization. In radical polymerization there will be some degree of shrinkage. As the number of unsaturations per molecule of the first and of the second component equals 1, the radical copolymerization will result in the formation of a linear polymer. As the polymer is linear, and consequently thermoplastic, it is possible to meter an amount of resin composition to the mould afterwards to compensate for the shrinkage. After that, the curing is effected via the polyisocyanates, during which curing process, however, the shrinkage is substantially less than during the preceding radical polymerization. During the formation of the urethane, the crosslinking takes place. The succession of the various reactions can be pre-set by the choice of the reaction conditions and of the various catalysts, according to techniques known in the art.

Besides, it is possible to cause the radical and urethane reactions to take place simultaneously in order to obtain a quick total reaction. It is further possible to allow the radical reaction to take place after the urethane reaction. This is e.g. described in EP-A-197.682, examples 1-5 page 10, but then it will no longer be possible for the amount of shrinkage that occurs during the radical step in the curing process to be reduced by subsequent metering of material.

The advantage of a composition according to the invention is that the non-reacted composition only contains low molecular weight components and therefore has a low viscosity. A composition according to the invention generally has a viscosity of between 1 and 150 mPas measured at 23° C. on a composition containing the first and second components in an arbitrary weight ratio, for instance 1:1.

This is a major advantage when used in processing techniques like the said resin injection moulding technique (RIM technique).

It is an other advantage of the composition according to the invention that articles can be made with it in a mould using the RIM technique, in which process the shrinkage that occurs is compensated by subsequent metering of material, which makes it possible, inter alia, to produce articles with a smooth surface structure and a good dimensional stability.

The invention also relates to a process for using a composition as described hereinbefore in resin transfer moulding (RTM), reaction injection moulding (RIM), reinforced reaction injection moulding (RRIM) and preferably in structural reaction injection moulding (SRIM).

RIM is a technique in which a mixture is injected into a mould and after injection cures within a short period of time.

RRIM is a RIM technique in which the mixture also contains fibrous reinforcing material.

SRIM is a RIM technique in which a fibrous reinforcing material is already contained in the mould before the injection of the mixture.

It is possible for the said mixtures to be prepared immediately before injection by mixing two or more submixtures which are not reactive individually, but do provide a reactive mixture when combined.

RTM is a technique to be regarded as equivalent to SRIM in which an amount of fibrous material is contained in a mould and a mixture is injected into the mould. Optionally, a vacuum can be created in the mould. RTM differs from SRIM in that the mixture is usually not prepared by mixing two or more submixtures just before injection.

In the SRIM technique in particular it is an advantage for the mixture to be of a low viscosity, because in the SRIM technique the wetting of the fibres must be take place in the mould within a short period of time.

So the composition may contain fibrous reinforcements to improve the mechanical properties of the articles prepared from the composition. Generally, 5 to 80% (wt) fibrous material can be added.

Suitable fibrous materials are glass, asbestos, carbon and organic fibrous materials, such as aromatic polyamides. Glass fibres may be present in any suitable form, for instance in the form of a mat, tape or ribbon, in the form of continuous fibres or chopped staple fibres. In the form of continuous fibres they may have a random structure, or may have been processed to form a fabric.

When using the composition, it is possible for the fibrous reinforcement to be added to the mixture to be injected (RRIM), provided these fibres are short enough, and it is possible also for the fibrous structure to be put in the mould before the injection (SRIM).

If processed in a process according to the invention, the composition according to the invention has the advantage that the composition at first consists of a mixture of low molecular weight monomers having a low viscosity. This makes it possible for the mixture to be injected into a mould already containing fibrous reinforcing material, in which a proper wetting of the fibrous material can take place. Depending on the choice of the curing system, the radical curing can now be carried out first and the urethane curing afterwards, or the urethane curing process can be carried out first and the radical curing afterwards, or the two curing processes can be carried out virtually simultaneously.

Preferred is the curing system in which the radical curing is carried out first followed by the urethane curing.

The unsaturated monomer which the second component consists of can be chosen from all monomers capable of reacting with the ethylenic Unsaturation of the first component, including vinyl monomers such as, for instance, vinyl esters, vinyl ethers, aromatic vinyl compounds, vinyl nitriles, acrylates or methacrylates. Examples are styrene, α-methylstyrene, p-methyl-styrene, vinyl toluene and methyl, ethyl, propyl acrylate or methacrylate. Suitable also are monomer mixtures. It is possible also to use bifunctional or multifunctional monomers, such as divinyl benzene, diailyl phthalate or triallyl cyanurate. The latter monomers are preferably applied in relatively small amounts.

The ratio of the second component and the first component is between 95:5 and 5:95 (in weight). Preferably the ratio is between 80:20 and 20:80. The choice is determined by, among other things, the desired crosslink density of the cured composition.

The third component contains at least an average of more than 1.75 isocyanate groups, and preferably 2 to 3 isocyanate groups per molecule. More preferably the functionality is 2.2 to 2.7 on average. The polyisocyanate may, for instance, be an aliphatic, an aromatic or a cycloaliphatic polyisocyanate, or a combination of two or more different grades. Examples are toluene diisocyanates. 1,5-naphthalene diisocyanate, cumene-2,4-diisocyanate, 4-methoxy-1,3-phenylene diisocyanate, 4-chloro-1,3-phenylene diisocyanate, 4-bromo-1,3-phenylene diisocyanate, 4-ethoxy-1,3-phenylene diisocyanate, 2,4'-diisocyanato diphenylether, 5,6-dimethyl-1,3-phenylene diisocyanate, 2,4-dimethyl-1,3-phenylene diisocyanate, 4,4'-diisocyanate diphenyl ether benzidine diisocyanate, 4,6-dimethyl-13-phenylene diisocyanate, durene diisocyanate, 4,4'-diisocyanate dibenzyl, 3,3'-dimethyl-4,4'-diisocyanate diphenyl, 2,4-diisocyanate stilbene, 3,3'-dimethoxy-4,4'-diisocyanate phenyl methane, 3,3'-dimethoxy-4,4'-diisocyanate diphenyl, 1,4-anthracene diisocyanate, 2,5-fluorene diisocyanate, 1,8-naphthalene diisocyanate, 2,6-diisocyanato benzfuran amyl benzene-2,4diisocynate, hexyl benzene-2,4-diisocyanate, dodecyl benzene-2,4-diisocyanate, butyl benzene-2,4-diisocyanate.

The polyisocyanate is preferably carbodiimide-modified diphenylmethane 4,4'-diisocyanate.

It is possible to influence the degree of cross-linking by adding mono-functional isocyanates or mono-alcohols or mono-amines without ethylenic unsaturation. It is possible also to vary the number of crosslinkages of each amount of composition by adding as a fourth component a diol, polyol or other polyfunctional isocyanate-reactive component, such as diamines or amino alcohols, and optionally also an excess of polyisocyanate, so that longer polyurethane lengths will be formed between the crosslinks.

Preference is given to the addition of 2–20% (wt), calculated on the total composition, of a fourth component with two or more isocyanate-reactive groups or two or more ethylenic unsaturations and a molecular weight of 500 to 3000.

Generally, the number of isocyanate groups calculated on the number of hydroxyl groups (NCO/OH)is not fewer than 0.8 and not more than 1.6 (mole/mole). It is possible to add a higher ratio of isocyanate groups, but then the mechanical properties of articles made from the composition will deteriorate.

The mixture contains catalysts promoting the copolymerization of the unsaturated monomer in the second component with the unsaturation in the first component. These may in principle be the same systems as used in the case of unsaturated polyesters, when used as RIM system, the formation of gas is undesirable and that is why moisture-containing peroxide catalysts are less desirable. Examples of radical-forming substances are peroxides, such as hydroperoxides, ketone peroxides and peresters. Examples are benzoyl peroxide, ditertiary butyl peroxide, cyclohexanone peroxide, tertiary butyl perbenzoate and tertiary butyl peroctoate, as well as photoinitiators sensitive to visible light or ultraviolet-sensitive photoinitiators.

The amount of catalyst is usually between 0.5 and 5% (wt) calculated on the unsaturated components. Besides, an accelerator may be present, for instance a cobalt compound or an amine.

The composition may further contain catalysts for the urethane reaction. If both catalyst systems are used, the gellation may be very rapid, so that in the production process short cycle times can be realized.

Compositions like those of the invention have a low viscosity and can therefore be easily moulded or injected. It is possible in the process to fill the composition with fillers, fibre reinforcements and the like without such an increase of the viscosity that the composition can no longer be used in the RIM process.

The composition may also contain additions like pigments, stabilizers, for instance antioxidants and UV stabilizers, fillers like talc, mica, calcium carbonate, aluminium or carbon black.

Compositions according to the invention can be used, inter alia, for the production of articles according to the RIM technique. The composition will generally be used in a so-called binary system (two-component system) which consists of a first binary system consisting of a first element containing a first component consisting of a compound with at least an ethylenic unsaturation and an isocyanate-reactive group and optionally an amount of a second component containing an unsaturated monomer capable of polymerizing with the first component, and a second element containing a third component, which is a polyisocyanate, and optionally an amount of the second component, characterized in that the first component substantially consists of the hydroxyl ester of (meth)acrylic acid. The catalysts and/or initiators are distributed over these elements according to a process known to the person skilled in the art.

The invention will be elucidated by means of the following examples without being limited thereto.

The mechanical properties were determined as follows: tensile strength, elongation at break and E modulus according to DIN 53455, flexural strength and E modulus according to DIN 53452, impact strength according to to DIN 53453, HDT according to ASTM-D-648-72 and Barcol hardness according to ASTM-D2583. The acid number was determined according to DIN 53402. The hydroxyl number was determined according to DIN 53240. The viscosity was determined with a Brookfield viscometer, type HBTD, with spindle 1,100 rpm.

EXAMPLE I

To a mixture of 200 g hydroxyethyl methacrylate (HEMA) and 200 g styrene was added 8 g benzoyl peroxide (BPO) (50% paste) as radical initiator, and dissolved.

After that the mixture was deaerated. Subsequently were added 0.8 g diethyl aniline (DEA) as accelerator, 220 g carbodiimide-modified methylene-4,4'-diphenyldiisocyanate (MDI) with a functionality of 2.3 (IsonateR 143 L of Dow Chemicals) and 0.01 g dibutyltin diacetate as urethane catalyst. The viscosity of the mixture was 15 mPa.s at 23° C. The mixture was poured between two flat chromium-plated sheets (20×40 mm) that were 4 mm apart. The product of example 1 was subjected to the following curing cycle: 20 hours 25° C., 4 hours 40° C., 4 hours 80° C. and 8 hours 120° C. Subsequently, test bars were sawn. On these bars the mechanical properties and HDT were determined. They are mentioned in table 1.

The product is characterized by excellent mechanical properties (high strengths and moduli) and a good HDT. By extra aftercuring for 4 hours at 200° C. the HDT is even increased to 165° C. without adversely affecting the mechanical properties.

TABLE 1

| Example | Mechanical properties | | | |
|---|---|---|---|---|
|  | I | II | III | IV |
| HDT (°C.) | 142 | 129 | 116 | 148 |
| Tensile strength (MPa) | 108 | 96 | 91 | 94 |
| E-modulus (GPa) (DIN 53455) | 4100 | 3390 | 3500 | 3420 |
| Elongation at break (%) | 4.6 | 4.2 | 7.1 | 4.0 |
| Flexural strength (MPa) | 164 | 155 | 157 | 141 |
| E-modulus (GPa) (DIN 53452) | 3680 | 3500 | 3450 | 3380 |
| Impact strength (kJ/m2) | 15 | 16 | 30 | 16 |
| Barcol hardness | 40 | 40 | 42 | 44 |

EXAMPLE II

The process of example I was repeated using 100 g HEMA, 300 g styrene and 110 g MDI. The viscosity of the mixture was 10 mPa.s. The mechanical properties are shown also in table 1.

EXAMPLE III

The process of example I was repeated using a mixture consisting of 100 g HEMA, 260 g styrene and 40 g ethoxylated bisphenol A (BPA.12EO), which 124 g MDI was added to.

The viscosity of the resulting composition was 14 mPa.s at 23° C.

The aftercuring cycle was 20 hours at 25° C., 4 hours 40° C., 4 hours 80° C., 4 hours 120° C. and 4 hours 160° C. The mechanical properties are shown in table 1.

It has been found that by adding a long-chain diol the impact strength of the product can be increased without the HDT being lowered too much.

EXAMPLE IV

The process of example I was repeated using a mixture consisting of 100 g HEMA, 243 styrene and 57 g vinyl ester (the reaction product of the diglycidyl ether of bisphenol A with 2 moles methacrylic acid), which 133 g MDI was added to. The viscosity of the resulting composition was 13 mPa.s at 23° C.

The aftercuring cycle was 20 hours at 25° C., 4 hours 40° C., 4 hours 80° C., 4 hours 120° C. and 4 hours 160° C. The mechanical properties are shown in table 1.

This composition, too, gives excellent mechanical properties and a high HDT.

EXAMPLES V AND VI

The volume shrinkage of examples I, II, III and IV was 8%.

The volume shrinkage of the composition of Example I and Example II were reduced to 3% (Ex. V) and 2% (Ex. VI) respectively by applying the polymerisable composition according the invention in a RIM-apparatus. In such apparatus the polymerisable composition was kept under pressure during curing. Due to the fact that first the radical polymerisation took place, resulting in a thermoplastic polymer, the volume shrinkage was compensated by the addition of material which was pressed into the mould, after which further curing took place.

I claim:

1. A reaction injection molding process for making products from a composition which contains at least 70% of low molecular weight compounds capable of forming a crosslinked polymer, which composition contains a first component consisting of a compound with at least an ethylenic unsaturation and an isocyanate-reactive group, a second component containing an ethylenically unsaturated monomer capable of copolymerizing with the first component, and, as a third component, a polyisocyanate, wherein the first, second and third components are monomers having a molecular weight less than 1000, the first component consists of a monomer having 1 terminal vinyl group and 1 isocyanate-reactive group per molecule and a molecular weight less than 500, wherein the polymerization of the first and second components takes place before the reaction of the first and third components.

2. Process according to claim 1, characterized in that the composition also contains 2 to 20% of a fourth component, which component has two or more isocyanate-reactive groups or two or more ethylenic unsaturations and a molecular weight of between 500 and 3000.

3. Process according to claim 1, characterized in that the composition consists of monomers with a molecular weight lower than 500, the first component of which consists of monomers with a molecular weight lower than 400.

4. Process according to claim 1, characterized in that the isocyanate-reactive group is a hydroxyl group.

5. Process according to claim 1, characterized in that the first component has the following general formula:

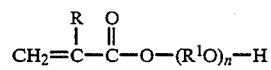

where R is a hydrogen or methyl, $R^1$ is an alkylene group with 2 or 3 carbon atoms and n is a whole number between 1 and 6.

6. Process according to claim 1, characterized in that the ratio of the second component and the first component is between 95:5 and 5:95 (in weight).

7. Process according to claim 1, characterized in that the third component contains at least an average of 1.7 isocyanate groups.

8. Process according to claim 1, characterized in that the third component contains an average of 2.2 to 2.7 isocyanate groups.

9. Process according to claim 1, characterized in that the second component is chosen from the group consisting of styrene, p-methylstyrene, vinyl toluene, methyl-, ethyl-, propyl acrylate or methacrylate.

10. Process according to claim 1, characterized in that the composition has a viscosity of between 1 and 150 mPa.s measured at 23° C.

11. Process according to claim 1 wherein the first component consists of at least 70% of the hydroxylester of (meth)acrylic acid.

12. Product obtainable by the process according to claim 1.

13. Composition to be used in Resin Injection Molding technique (RIM) which contains at least 70% of low molecular weight compounds capable of forming a crosslinked polymer, which composition contains at least a first component which consist of a compound with at least an ethylenic unsaturation and an isocyanatereactive group and which has 1 terminal vinyl group and 1 isocyanate-reactive group per molecule, a second component containing an ethylenically unsaturated monomer capable of copolymerizing with the first component, a third component which is a polyisocyanate, and 2–20% of a fourth component containing at least an isocyanate reactive group or an ethylenic unsaturation, wherein the first, second and third components are monomers having a molecular weight less than 1000, the first component having a molecular weight lower than 500, the fourth component of which has two or more isocyanate-reactive groups or two or more ethylenic unsaturations and a molecular weight between 500 and 3000, wherein the polymerization of the first and second components takes place before the reaction of the first and third components.

14. Kit of parts consisting essentially of a first element and a second element, said first element containing a compound with at least an ethylenic unsaturation and an isocyanate-reactive group, and said second element containing a polyisocyanate, wherein at least about 70% of said first component is the hydroxyl ester of (meth)acrylic acid.

15. Kit of parts according to claim 14, which consists essentially of said first element and said second element,
wherein said compound contained in said first element comprises a first component and is represented by the following general formula:

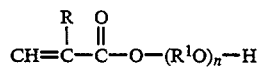

where R is a hydrogen or methyl, $R^1$ is an alkylene group with 2 or 3 carbon atoms and n is a whole number between 1 and 6, and with a molecular weight lower than 500;
wherein said polyisocyanate of said second element comprises a third component and has a molecular weight less than 1000;
wherein said first element or said second element contains a radical catalyst;
wherein at least said first element or said second element contains a second component which is a monomer having one ethylenic unsaturation and having a molecular weight below 1000; and
wherein the weight ratio of the second component to the first component is between 95:5 and 5.95.

* * * * *